(12) United States Patent
F.

(10) Patent No.: US 7,461,608 B1
(45) Date of Patent: ***Dec. 9, 2008

(54) TRANSONIC HULL AND HYDROFIELD II

(76) Inventor: Alberto Alvarez-Calderon F., 410 Fern Glen, La Jolla, CA (US) 92037

( * ) Notice: Subject to any disclaimer, the term of this patent is extended or adjusted under 35 U.S.C. 154(b) by 0 days.

This patent is subject to a terminal disclaimer.

(21) Appl. No.: 09/672,190

(22) Filed: Sep. 28, 2000

(51) Int. Cl.
*B63B 1/00* (2006.01)
(52) U.S. Cl. ..................... 114/61.3; 114/56.1
(58) Field of Classification Search ......... 114/56.1, 114/61.26–63, 6.27, 271, 291, 61.29, 61.3, 114/61.31, 61.32; D12/300, 313, 314
See application file for complete search history.

(56) References Cited

U.S. PATENT DOCUMENTS

| 23,626 | A | * | 4/1859 | Tucker | 114/61.3 |
| 214,101 | A | * | 4/1879 | Clapham | |
| 514,835 | A | * | 2/1894 | Mills | 114/56.1 |
| 5,711,239 | A | * | 1/1998 | Ramde | 114/56 |
| 6,158,369 | A | * | 12/2000 | Calderon | 114/56.1 |

* cited by examiner

*Primary Examiner*—Ed Swinehart

(57) ABSTRACT

A wave reducing and eliminating ship hull including a generally triangular hull having a pointed narrow bow portion and a stern portion wider than the bow portion, the hull including generally rectilinear diverging sides extending substantially from the bow to the stern. The hull further includes a draft adjacent the bow deeper than the draft adjacent the stern, and the bow portion of the hull is generally free of depending structures.

9 Claims, 3 Drawing Sheets

TRANSONIC HULL AND HYDROFIELD II

BACKGROUND OF THE INVENTION

1. Technical Field

The present invention relates to improvements on Transonic Hull (TH), and transonic hydrofield (T̲H̲), of application Ser. No. 08/814,418. More particularly, it pertains to certain relations between hydrostatic and hydrodynamic design parameters, to the relation between draft at the hull's stern, center of gravity position, speed regimes, effect of drag on hull's efficiency, and various other effects of draft at the hull's stern. The improvements have been established by means of TH/T̲H̲ theory, and of tank and model testing, and have yielded important results for the utility of the TH invention.

2. Description of the Prior Art

Although certain vessels having triangular hull planform shape apparently similar in some respect to TH have been proposed in the past (for example, those cited by the Patent Office in the examination of application Ser. No. 08/814,418), these have been designed to have approximately equal drafts adjacent the stern and the bow, as in conventional ship design. The Japanese Patent 61-125981A of Mitsubishi Heavy Industries teaches, in all its embodiments, that the draft at stern and bow of this approximately triangular hull planform are approximately equal and the same as midbody draft. In this they followed earlier design criteria, even as far back as that of U.S. Pat. No. 23,626 of 1859, which also shows equal draft at bow, stern, and midbody. The deep stern drafts with broad beams at the stern are extremely inefficient.

In both the above-mentioned patents, the location of the center of buoyancy (CB) of their hulls, and therefore the location of their centers of gravity (CG) would be, by reason of their planforms and equal drafts, at or very close to their center of planform areas and waterplane, also known as longitudinal center of flotation (LCF), which is at 66% of water line length aft of the bow, unless a bow bulb is used. This proximity of CG, CB, and LCF is usual for conventional hulls. Moreover, such prior art does not consider the effects of CB and CG location on drag under forward motion.

In respect to proximity of CG, CB, and LCF, I have discovered that their proximity as in conventional hulls is not viable for TH, because it renders this type of hull with unstable tendencies in pitch under fast motion, when subjected even to a minor pitch disturbance. Such adverse behavior is similar to a phugoid self-sustained oscillation of aircraft when its center of gravity is close to its neutral point. In a ship, such oscillations not only increase drag, but are undesirable for structures, for cargo and for passengers, and may be dangerous.

Such fundamental problems are serious. The Mitsubishi patent teaches a solution to this problem by means of a bow bulb. Thus, it mixes a bulb technology which was developed and is useful for fat, slow ships, with a different type of hull. This adds drag, as well as volume, to their design, and the drag issue is not priority for prior art.

In contrast, TH and T̲H̲ of application Ser. No. 08/814,418 make a totally different and innovative solution: it combines, in the submerged portion of TH, a deep draft forward and a shallow draft to the rear, which normal architectural ship design would consider dangerous with an inherent dive potential unless a bow bulb were used. However, following model tests, this writer confirmed that TH theory is correct in that dive tendencies are not determined on a triangular planform. The TH solution renders an inherent distance between LCF and center of buoyancy and therefore has a center of gravity substantially ahead of the LCF. Moreover, the quantitative aspects in the relation between CB, CG, LCF, and stern draft is dependent, I have discovered in relation to lack of dive tendency and established in respect to payload, with reference to the distinctions between the hydrostatic stern condition and the stern's hydrodynamic condition in the supercritical and subcritical regimes, as is done in the present CIP patent application in respect to limits of distances between LCF, CB, CB, and effect on static draft. Furthermore, these key relations are established in the present work in relation to the hydrodynamic drag consequence of entry and exit flow angles in its various speed regimes.

SUMMARY OF THE INVENTION

The invention pertains to transonic hull and transonic hydrofield. It relates to the static condition of the hull its dynamic conditions in the supercritical and subcritical regimes, by prescribing relations between the hydrodynamic entry angle of planform to exit angle in profile, and by relating the hydrostatic stern draft to center of gravity and longitudinal center of flotation in respect to hydrodynamic drag and pitch behavior in the supercritical and subcritical regimes, which are governed in important part by wake conditions.

DESCRIPTION OF THE PREFERRED EMBODIMENT

Figure 1:
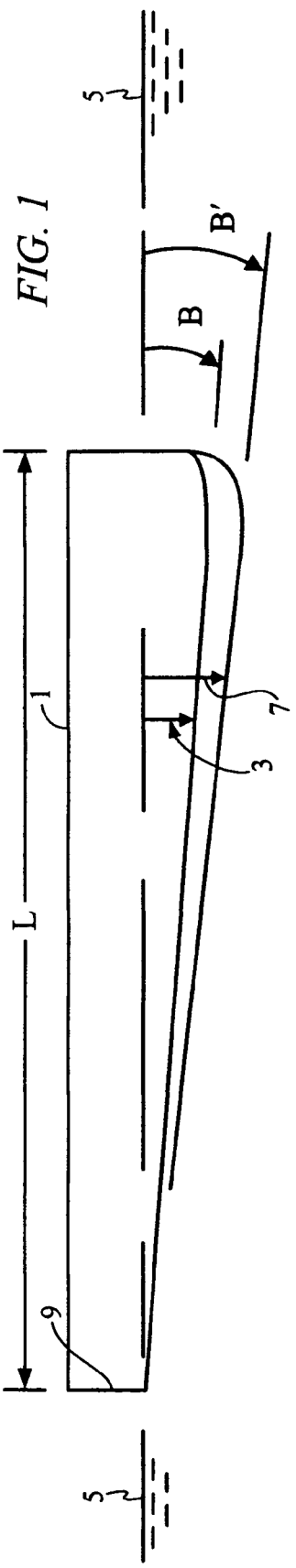
FIGS. 1, 2 and 3 are views of the cover planform and profile view of TH, and planview of TH of the present invention.

1. Introduction and Conceptual Inquiry.

The important TH improvements of the present invention are related to TH and T̲H̲ of my patent application Ser. No. 08/814,418 and can be best understood by a brief review of that application and the conceptual inquiry this review raises. Accordingly, FIG. 1, taken from that patent application, is a side view of TH having a hull 1 with a submerged hull portion 3 of length L, the undersurface of which is at a negative angle of approximately 3.5° relative to water level 5, with the deep draft forward. An alternative deeper submerged portion 7 makes a larger angle 1 of approximately 7°. Larger angles can also be used, for example 11°. However, the submerged portions are shown to have a shallow and virtually zero draft in side view at stern 9, in all cases exhibiting a substantially triangular profile shape of the submerged portion of the TH.

Figure 2:
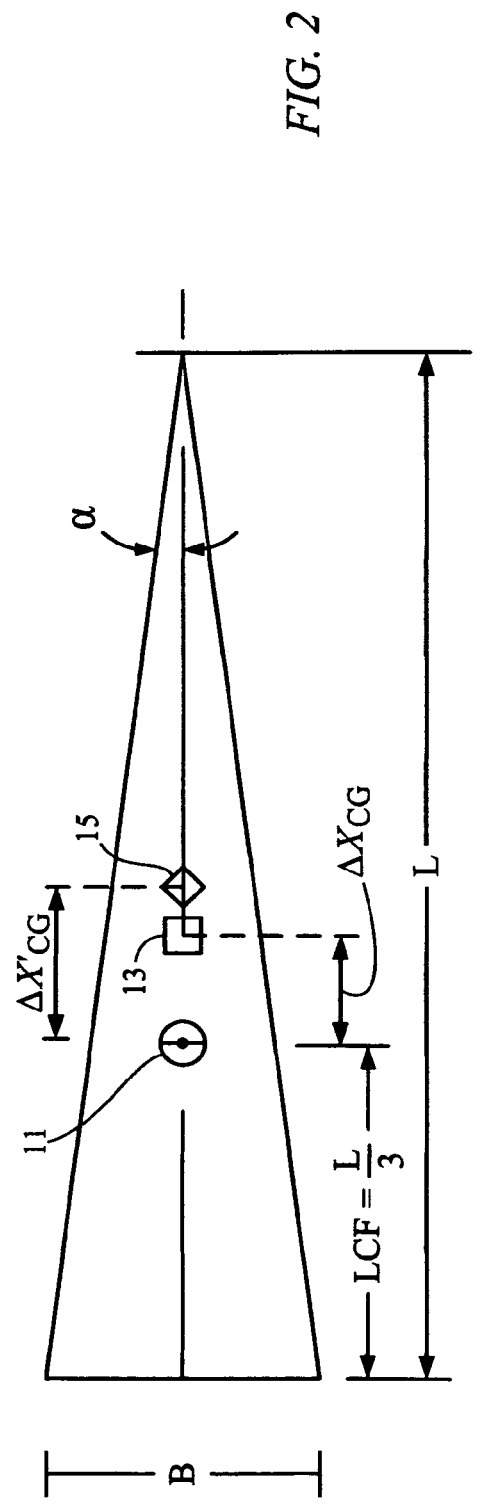

Accordingly, the planview of TH of FIG. 1 as is shown in FIG. 2, has a waterplane is substantially triangular, and the centroid of its area, also called (for reasons unclear to this writer) longitudinal center of flotation LCF, is inherently at one third the length of the waterplane forward of the stern. The semi-angle of entry at bow is of small magnitude 7.1°, as shown in the drawing, even though the length-to-beam ratio is large, i.e. 4:1. The entry angle could be larger up to about 11°.

The center of gravity positions shown in FIG. 2 are $\Delta XCG$ for angle $\beta$, and a larger distance $\Delta X^1 CG$ for larger angle $\beta^2$, both distances forward of LCG, but undefined in magnitude.

The teachings above corresponding broadly to patent application Ser. No. 08/814,418, but does not cover important subjects related to hull efficiency. For example:

a. What is best stern draft in static case to obtain best efficiency with forward motion?

b. What are best CG positions ahead of LCF to obtain optimum efficiency as related to stern draft?

c. Until the present analysis, what is the important optimized relation between the angle of entry of the planview, which minimizes formation of bow wave, and undersurface exit angles $\beta$ and $\beta^1$, which counter the formation of a stern wave?

Figure 3:
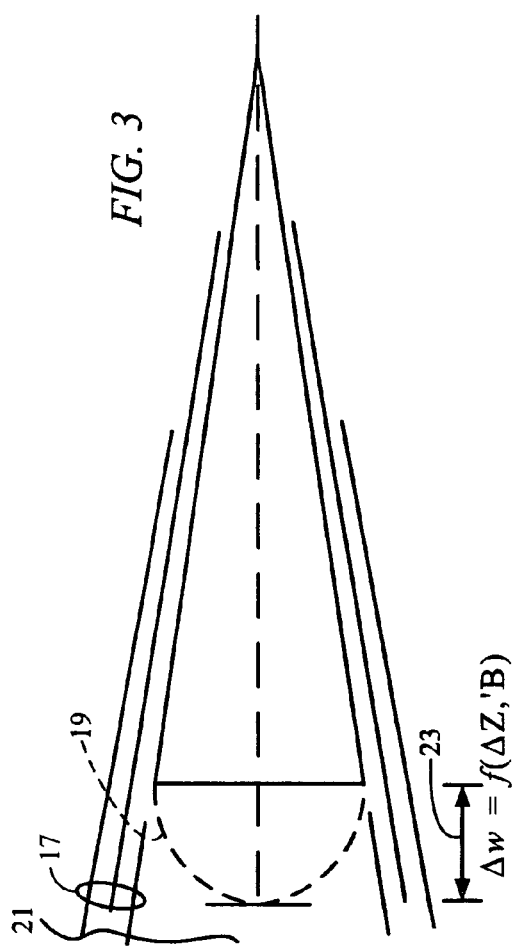

Consider FIG. 3, which shows the two hydrodynamic regimes of TH in motion, the supercritical TH regime, with rays 17 and flat wake 21, corresponding to a speed/length greater than approximately 1.25, and the subcritical TH regime with wake transition borders shown as dash line 19, corresponding to a speed-to-length less than approximately 1.25. The speed-to-length ratio is in knots divided by square root of length in feet, and the values mentioned are somewhat dependent on ratio of weight-to-length, in which weight is in tons and length is actually the third power of length in feet divided by 100. These different speed regimes have important relation to static draft at stern, and in turn to weight-to-drag ratio, i.e., hydrodynamic efficiency; that is, it depends on CG position and stern draft.

2. TH/TH Design Parameters of the Present Invention.

Figure 4:
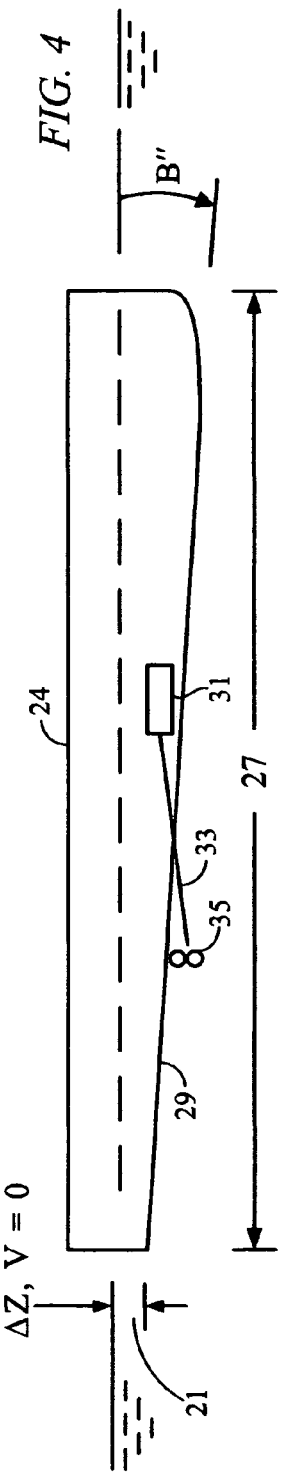
FIGS. 4, 4A and 5 cover specific quantifiable design parameters in accordance to present invention for the planview and profile view of TH, including relation of planform entry angle of flow and exit angle in profile of flow, and identify draft definitions.
Figure 5:
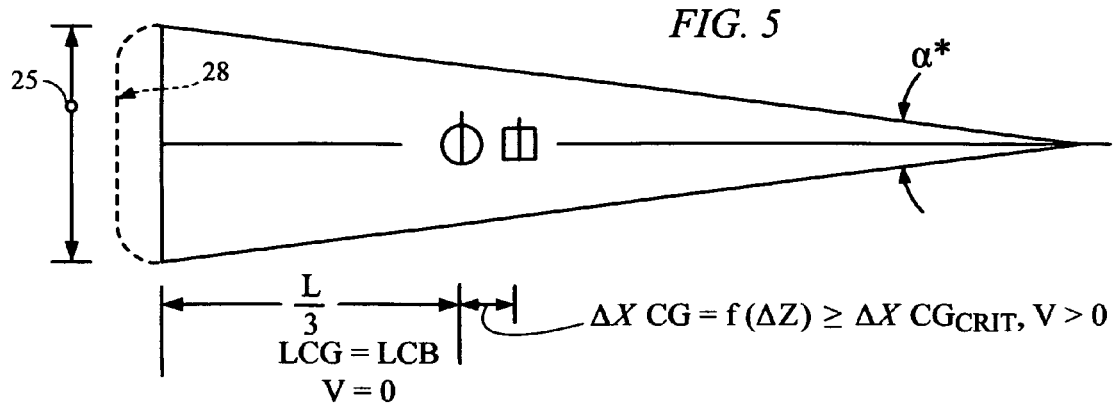

Theoretical considerations, backed up by test data of models, establish in the present invention my discovery that there are important quantifiable relations between LCF, CB, CG, stern draft, planform angle of entry and exit profile angle, stern draft and performance of TH, as is specified below in reference to FIGS. 4-6.

a) FIG. 4 shows depth of transom 21 in static conditions, which in turn depends on CG's location relative to LCF shown in FIG. 5, and alters angle of undersurface to, say, $\beta^{11}$ value shown in FIG. 4, which is different from hydrodynamic $\beta^1$ or $\beta$ in earlier figures.

b) The relation LCG-LCB=$\Delta$XCB shown in FIG. 5 governs to an important extend the speed-to-length ratio at which transition from subcritical to supercritical occurs, as dependent on length 23 in FIG. 3, and on beam 25 in FIG. 5, thus establishing lower speed regime range and upper speed range of efficient operation of TH.

c) Moreover, there is a critical minimal distance $\Delta$XCG between CG and LCF, shown in FIG. 5, which governs $\Delta$Z in FIG. 4 and is thus related to the performance parameter weight/drag. Moreover, there is another minimum value of $\Delta$XCG called herein $\Delta$XCG critical, which is equivalent to determining a neutral point for pitch stability, in analogy to the neutral point which governs pitch stability of aircraft. If for TH's archetype $\Delta$XCG in FIG. 5 is made too small, pitch oscillations similar to phugoids in aircraft will be excited by minimal external pitch disturbances.

d) Another relation of importance in respect to stern wake, $\Delta$Z, and drag is the shape relation of in planform and profile of TH, as these also govern, $\Delta$Z, $\Delta$XCG, LCF, etc., and the hull shapes are governed by two important angles: the planform entry angle $\alpha^*$ and the exit profile angle $\beta^*$.

Thus, in my discoveries, according to TH theory and TH experiment, I have established and confirmed through TH model tests the critical relation of $\Delta$Z in static conditions such as is shown by draft 21 on static TH 24 in FIG. 4 with undersurface angle $\beta$, to location of center of CG forward of centroid of area at a distance $\Delta$XCG, as shown in FIG. 5. The distances in respect to the stern are shown in FIG. 4 as LCF of L/3 and LCG as somewhat larger, all these distances measured from stern forward, which respond to the inherent formulation of TH, rather than from forward post to the rear, as is usual for conventional ships.

Figure 6A:
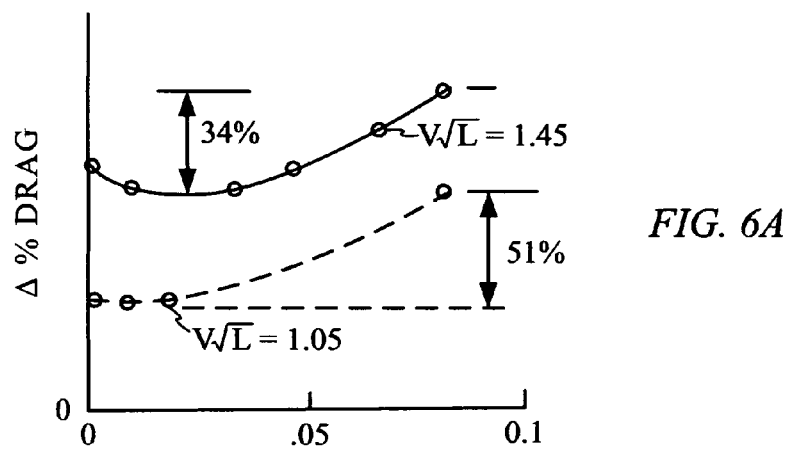
FIGS. 6A and 6B specify the relation between stern draft, hydrodynamic drag, and center of gravity positions.

The effect of static $\Delta$Z on hydrodynamic drag under forward motion is shown in FIG. 6A, with relative drag changes in the vertical axis, and the static stern draft $\Delta$Z in the horizontal axis, expressed as fractions of stern's beam 25 in FIG. 5, that is, as $\Delta$Z/B.

Figure 6B:
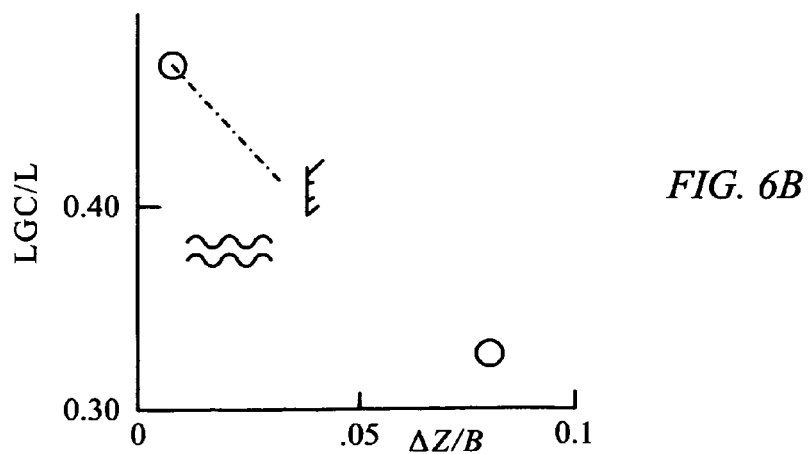

The corresponding relation between the position of center of gravity and stern's draft is shown in FIG. 6B, in which the adverse case of old art, namely, equal drafts at bow and stern is numerically equal to $\Delta$Z/B=0.081.

It is seen in FIG. 6 that if static draft is equal to 0.08 of beam to which corresponds a CG at the centroid of waterplane area for equal stern and bow draft, the hydrodynamic drag is very large, and the concepts of subcritical and supercritical hydrodynamic regimes of TH would not apply or make sense.

In accordance to the test data of this invention, in the supercritical regime at $v/\sqrt{L} \approx 1.45$, the static draft should be reduced by a factor of 4 from 0.08 to approximately 0.02. Then the hydrodynamic payoff is a drag is reduction by 34%, which is extremely important for range and speed, apart from the large gains of stability in pitch. Further reductions of stern draft at $v/\sqrt{L} \approx 1.45$ show an increases of drag.

And in accordance to tests of the TH invention, in the subcritical regime at $v/\sqrt{L} \approx 1.05$, the static draft should be reduced from 0.08 to 0.01, a factor of 8 compared to old art. The hydrodynamic drag payoff is then a reduction of drag by approximately 51%, again extremely important for range and speed, apart from the stability gains, also very important.

Figure 4A:
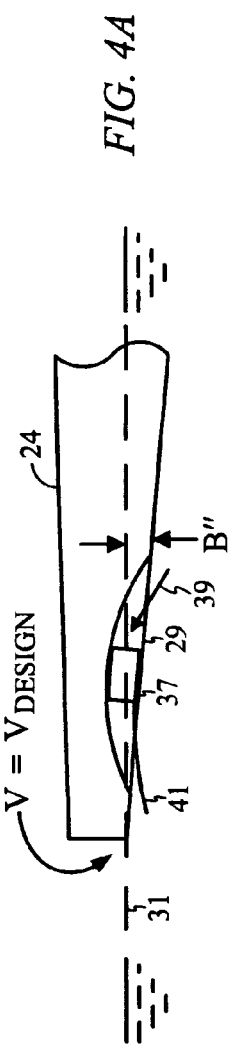

As the parameters described in FIGS. 4 to 6B are dependent on planform and submerged profile angles which govern volume distribution, it is very important to maintain the proper relation between planform entry angle shown in FIG. 5 to the dynamic exit angle alpha* that applies corresponds to the exit angle shown in FIG. 4a, between the rearmost portion 31 of TH's undersurface, adjacent the stern, and a line which, parallel to the water level, intersects the lower corner of the transom in the design speed envelope of TH. The $\alpha^*\beta^*$ relationship that provides the most efficient hydrodynamic results covers $\beta^*$ values from approximately one half $\alpha^*$ to higher value which approximate $\alpha^*$. However, $\beta^*$ can be increased for hulls of large displacement in which a forward portion of the undersurface is parallel to the static waterline due to draft limits in harbors, for example, as shown in FIG. 13C of application Ser. No. 08/814,418. In such a case, $\beta^*$ can exceed $\alpha^*$.

The range of stern draft of $\Delta$Z/B 0.01 to 0.02 for best hydrodynamic performance of FIG. 6B correspond to longitudinal position of the center of gravity which varies from about 0.44 L for smaller stern draft to about 0.41 L for the larger stern draft, but in both cases with a significant negative angle in TH's undersurface, as shown in FIGS. 4 and 4A. This range has the added and important benefit of having increased pitch stability.

It is possible to extend the range of LCG forward from that of FIG. 6B, for example to 0.48 L, by accepting an angle larger than angle $\beta$ in FIG. 4, if draft forward is not excessive, for example, in relation to water depth.

It is also possible to use a shorter LCG from stern, for example, to 0.385, but such choices start running into pitch stability problems, and those depend on mass distribution on a full size boat which need not be that used for model tests, and therefore the pitch stability area should be investigated and tested full size by a licensed boat builder as his responsibility.

The numerical values of the design criteria mentioned above are representative for the hull characteristics reviewed, and may be adjusted for specific TH hull shapes, thrust line positions, and other design features.

The present invention pertains to hydrodynamic conditions that require propulsion systems to achieve the specified speed-to-length ratio with which the draft variations and related parameters are attained. One important ratio is 1:25.

Accordingly, FIG. 4 shows an engine 31 driving by means of inclined shaft 33 a propeller 35 with a thrust line approximately parallel to the remote waterplane. In the higher speed regimes, for example, approximately at or above ratio of 1:45 shown in FIG. 6A, water jets can be used. This alternative is shown in FIG. 4A having a bottom water intake 39 for water jet 37 which exits at 41, in this case ahead of transom to decrease for military purposes white water in wake, which would occur if the exit of the water jet is at or above water level 31.

The specifications and drawings pertain to hydrodynamics, TH shapes and propulsion and does not cover structures or controls. Model tests are not sufficient for determining stability of full size manned TH of unknown weight or other safety related matter. These matters should be investigated and determined solely by licensed manufacturers, who have the sole responsibility in such matters and are obviously outside the scope of the present patent application and its claims, presented below.

Finally, it is to be understood that changes can be made on the drawings and specifications without departing from the teachings as covered in the claims of the invention.

I claim:

1. A wave reducing hull for a vessel having a bow, midbody and a stern; said hull being characterized in having:
   (a) a generally triangular waterplane having a pointed end adjacent said bow, and a maximum water beam adjacent said stern;
   (b) said waterplane having a generally rectilinear diverging sides extending substantially from said pointed end to said maximum water beam;
   (c) said waterplane having a midbody water beam substantially smaller than said maximum water beam;
   (d) said hull having a draft adjacent said pointed end deeper than the draft adjacent said maximum water beam; and
   (e) said draft adjacent said pointed end being no greater than approximately thirty three percent (33%) of said maximum water beam adjacent said stern.

2. The ship hull of claim 1 wherein said bow portion of said hull is generally free of depending structures.

3. A transonic hull with a displacement body portion below waterplane having in hydrostatic conditions a length, a bow, a midbody portion, a stern, and a generally triangular waterplane with an apex adjacent said bow, a wide waterplane beam adjacent said stern and a waterplane beam adjacent said midbody portion substantially smaller than said wide waterplane beam, said body portion having a first draft adjacent said bow substantially greater than a second draft adjacent said wide waterplane beam; said body portion being further characterized in having three principal longitudinal surface components, two of which form principal right and left side surface elements of said body portion, with the third principle longitudinal surface component forming a principal bottom surface element of said body portion.

4. The structure of claim 3 in which said submerged body portion has a longitudinal axis at its waterplane, with athwarship cross-sections perpendicular to said longitudinal axis, and with the projection of said cross-sections in end view forming a single peripheral envelope of said cross-sections with generally flat sides.

5. A transonic hull with a displacement body portion below waterplane having in hydrostatic condition a length, a bow, a midbody portion, a stern, and a generally triangular waterplane with a longitudinal axis, with a sharp end adjacent said bow, a wide waterplane beam adjacent said stern and a waterplane beam adjacent said midbody portion substantially smaller than said wide waterplane beam, said body portion having a first draft adjacent said bow substantially greater than a second draft adjacent said wide waterplane beam, said body portion being further characterized in that the lateral edges of said waterplane adjacent and meeting at said apex are substantially rectilinear, and in that the angle included between each of said lateral edges and said longitudinal axis is an acute angle of approximately 7°.

6. The structure of claim 5 further characterized in that the flow exit angle in side view established between a rearward undersurface portion adjacent said stern and a line parallel to waterplane intercepting the lower corner of said stern, being no greater than approximately the angle between said lateral edges adjacent said apex.

7. The structure of claim 6 further characterized in that said flow exit angle is approximately 60% of the angle between said lateral edges adjacent said apex.

8. A Transonic Hull having a submerged portion with a bow, a midbody portion, a stern and a length, with power means to move said hull in the water from a first stationary hydrostatic displacement condition to a second subcritical speed displacement regime and to a third faster super critical speed displacement regime, said submerged portion being further characterized in having:
   (a) a generally triangular waterplane with a sharp end adjacent said bow, a wide waterplane beam adjacent said stern and a waterplane beam adjacent said midbody portion substantially smaller than said wide waterplane beam,
   (b) a profile with a deeper draft adjacent said bow, the submerged part of said bow being generally free of depending structures, and a smaller draft adjacent said wide waterplane beam,
   (c) and with the draft of said stern varying from approximately 4% of said base relative to a static waterplane in said hydrostatic condition, to substantially zero relative to the water surface adjacent and downstream of said stern when in said subcritical and super critical regimes.

9. A wave reducing hull for a vessel comprising:
   a generally triangular hull having a pointed narrow bow portion, a midbody portion, and a stern portion having a beam wider than the width of said midbody portion;
   said hull having generally rectilinear diverging sides extending substantially from said bow to said stern;
   said hull further characterized in having (a) a generally triangular waterplane in static conditions with a narrow end forward, a rear water beam adjacent said stern portion, and a longitudinal waterline length there between; (b) a center of gravity location no less than approximately 38.5% of said longitudinal waterline length measured forward of said rear water beam; (c) power means to propel said vessel to a speed to length ratio no less than approximately 1.25 with said speed expressed in knots and said length defined as the square root of said longitudinal water length expressed in feet;
   said hull having in said static condition a draft adjacent said bow deeper than the static draft adjacent the rear water beam; and
   said draft adjacent said rear water beam being between approximately one percent (1%) and approximately four and one-half percent (4.5%) of said beam.

* * * * *